Nov. 11, 1958      H. J. MOISAN      2,859,514
PIPE AND TUBING CUTTER

Filed June 13, 1958      2 Sheets-Sheet 1

INVENTOR.
HENRY J. MOISAN,
BY
McMorrow, Berman & Davidson
ATTORNEYS

Nov. 11, 1958     H. J. MOISAN     2,859,514
PIPE AND TUBING CUTTER
Filed June 13, 1958     2 Sheets-Sheet 2

INVENTOR.
HENRY J. MOISAN,
BY
McMorrow, Berman & Davidson
ATTORNEYS

United States Patent Office 2,859,514
Patented Nov. 11, 1958

2,859,514

PIPE AND TUBING CUTTER

Henry J. Moisan, Washington, D. C.

Application June 13, 1958, Serial No. 741,863

3 Claims. (Cl. 30—101)

This invention relates to cutters for pipe and tubing, and more particularly to a pipe and tubing cutter which is especially adaptable for use in close quarters.

A main object of the invention is to provide a novel and improved pipe and tubing cutter which is simple in construction, which is easy to operate, and which is especially useful where space is limited.

A further object of the invention is to provide an improved pipe and tubing cutter which is inexpensive to manufacture, which is durable in construction, which is easy to set up for use, and which may be employed where space is very limited and where only a small amount of clearance is available for operating the cutter.

Further objects and advantages of the invention will become apparent from the following description and claims, and from the accompanying drawings, wherein:

Figure 3:
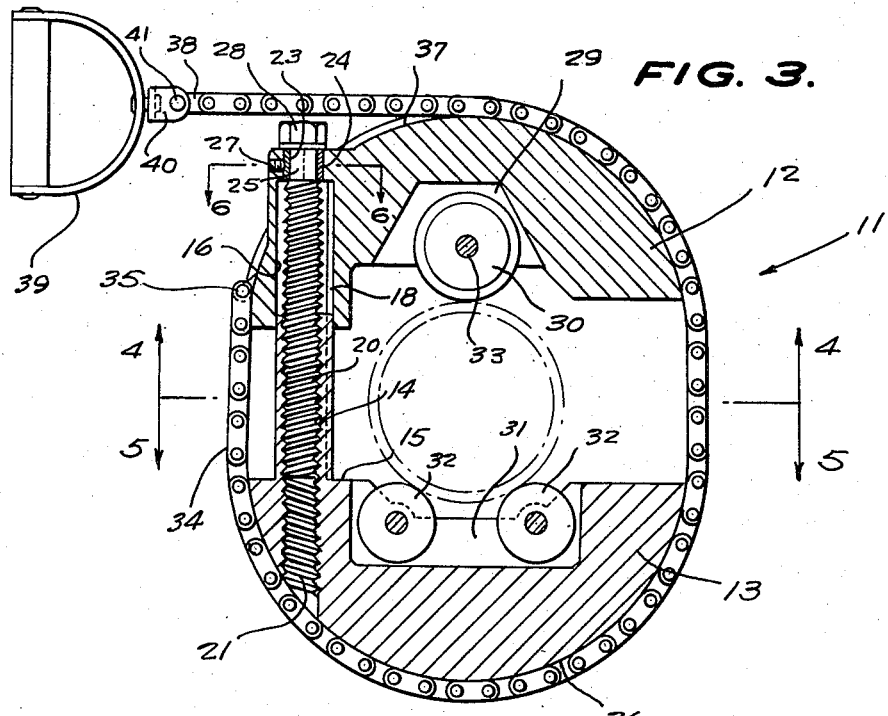
Figure 3 is a vertical cross sectional view taken on the line 3—3 of Figure 2.
Figure 4:
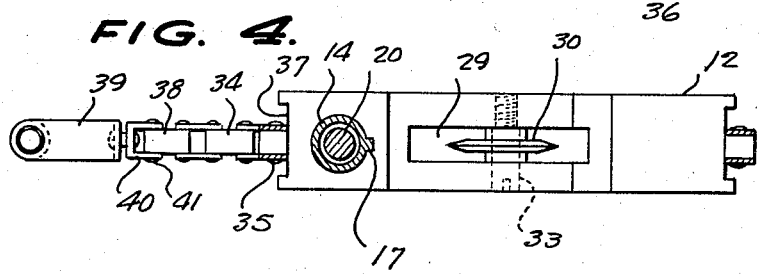
Figure 4 is a horizontal cross sectional view taken on the line 4—4 of Figure 3.
Figure 5:
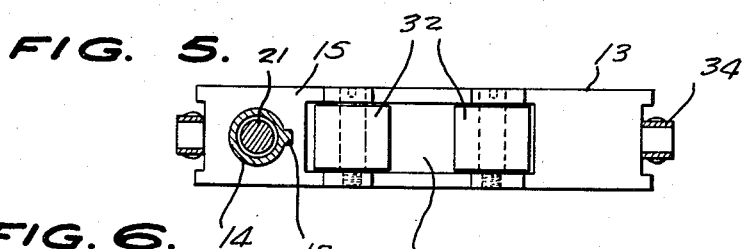
Figure 5 is a horizontal cross sectional view taken on the line 5—5 of Figure 3.
Figure 6:
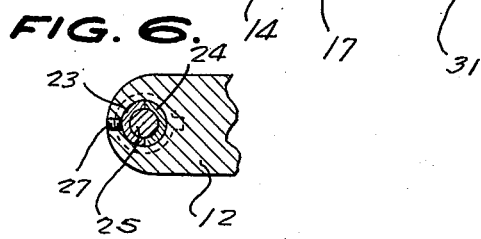
Figure 6 is a fragmentary horizontal cross sectional view taken on the line 6—6 of Figure 3.

Referring to the drawings, 11 generally designates an improved pipe and tubing cutter according to the present invention. The cutter 11 comprises a pair of opposing rigid jaw elements 12 and 13 which are generally U-shaped and which are arranged in substantially coplanar relationship. The jaw member 13 is integrally formed with an internally threaded tubular element 14 which is located at one side thereof and which extends perpendicular to the inside face 15 of the jaw member 13, as shown in Figure 3. The tubular member 14 is slidably received in a bore 16 formed in the opposing jaw member 12 at one side thereof, said tubular member being formed with an integral rib element 17 which is slidably received in a groove 18 formed in the bore 16, whereby the jaw members 12 and 13 are slidably and non-rotatably connected.

Designated at 20 is a screw member which extends through the bore 16 and which is threadedly engaged with the internal threads 21 of the tubular member 14. The screw member 20 is rotatably secured to the jaw member 12 by means of a pair of opposing semi-cylindrical collar segments 23 and 24 which are disposed in the top portion of the jaw member 12 around the reduced upper neck portion 25 of the bolt 20, the collar segments 23 and 24 being retained in encircling relationship relative to the reduced neck portion 25 by a set screw 27 provided in the adjacent portion of the jaw member 12, said set screw bearing on the outer collar segment 23 and maintaining same in abutting relationship with respect to the mating collar segment 24. Thus, the segments 23 and 24 provide a bearing for the reduced neck portion 25 of the bolt member, rotatably securing the bolt member to the jaw member 12.

The bolt member 20 is provided with the hexagonal external head portion 28 which may be engaged by a suitable wrench so that by rotating said bolt member the jaw members 12 and 13 may be moved in their common plane toward and away from each other.

Jaw member 12 is formed at its inner portion with a recess 29 in which is journaled a cutter wheel 30. Jaw member 13 is formed at its inner side with a recess 31 in which are journaled the spaced bearing rollers 32, 32, said bearing rollers being spaced equal distances from a common transverse axis which passes through the center of the supporting axle 33 of the cutter wheel 30.

Figure 1:
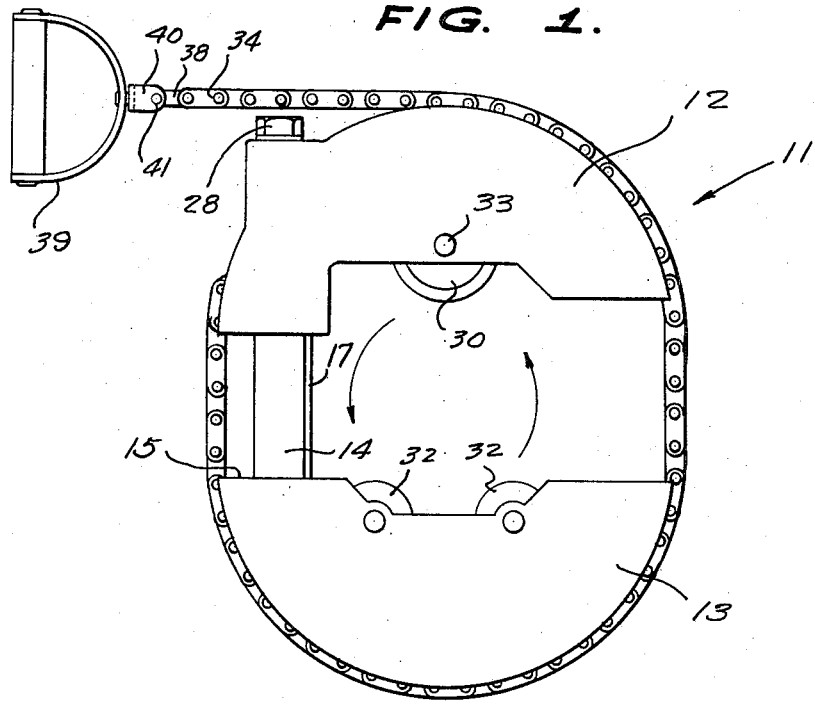
Figure 1 is a side elevational view of an improved pipe and tubing cutter constructed in accordance with the present invention.
Figure 2:
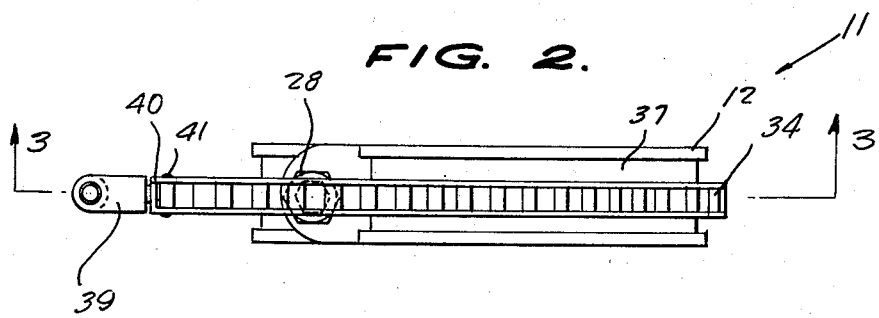
Figure 2 is a top view of the pipe and tubing cutter shown in Figure 1.

Designated at 34 is drive chain of the link type which is connected at 35 to the end portion of the jaw member 12 adjacent the bore 16, as shown in Figure 3, said drive chain 34 being engageable around the outer peripheral portions of the respective jaw members 13 and 12 in the manner shown in Figures 1 and 3, said outer peripheral portions being formed with guide grooves 36 and 37 adapted to receive the drive chain 34. Swivelly connected to the end link 38 of the drive chain 34 is a handle member 39, said handle member being rotatably connected to a U-shaped clevis member 40 which is in turn pivotally connected at 41 to the end link 38.

In using the device, the segments 12 and 13 are first separated sufficiently to engage same around a pipe to be cut, by unscrewing the bolt member 20, after which the pipe is engaged between the jaw members 12 and 13 and the bolt member 20 is then tightened to bring the cutter wheel 30 into engagement with the pipe with the pipe supported on the rollers 32, 32. The screw 20 is tightened sufficient to cause the sharp peripheral edge of the cutter wheel 30 to dig into the pipe, after which the device is rotated by means of the drive chain 34 and its handle 39, the chain being engaged around the jaw segments 13 and 12 in the manner shown in Figures 1 and 3, after which the handle 39 is pulled, causing the jaws 12 and 13 to rotate around the pipe, causing the cutter wheel 30 to bite into the pipe. After each of the cutting rotations of the device, the bolt 20 is further tightened by rotating its head 28, the process then being repeated until finally the pipe is cut completely through.

As will be readily apparent, the device may be employed where space is very limited, since it is merely necessary to engage the chain 34 around the jaw members 12 and 13, the chain being retained in the grooves 36 and 37, the cutter being rotated merely by pulling on the handle 39.

While a specific embodiment of an improved pipe and tubing cutter has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A pipe cutter comprising a pair of coplanar opposing jaw members, means slidably and non-rotatably connecting said jaw members for movement in a common plane toward and away from each other, a screw member rotatably mounted in one of the members adjacent said means and threadedly engaging the other member, a cutter wheel journaled in one of the members and facing the other member, a pair of spaced bearing rollers journaled on said other member opposite said cutter wheel, and a chain member secured to one of the members and extending around the other member, for rotating the jaw members.

2. A pipe cutter comprising a pair of coplanar opposing jaw members, an internally threaded tubular element on one of the members slidably and non-rotatably engaging the other member, a screw member rotatably mounted in said other member and threadedly engaged in said tubular element, a cutter wheel journaled in one of the jaw members and facing the other jaw member, a pair of spaced bearing rollers journaled on said other jaw member opposite said cutter wheel, and a chain member secured to one of the jaw members and extending around the other jaw member, for rotating the jaw members.

3. A pipe cutter comprising a pair of coplanar opposing generally U-shaped jaw members, an internally threaded tubular element on one of the jaw members slidably and non-rotatably engaging the other jaw member, a screw member rotatably mounted in said other jaw member and threadedly engaged in said tubular element, whereby the jaw members may be adjusted in their common plane toward and away from each other, a cutter wheel journaled in one of the jaw members and facing the other jaw member, a pair of spaced bearing rollers journaled on said other jaw member opposite said cutter wheel, a chain member secured to said one jaw member and extending around the other jaw member, for rotating the jaw members, said jaw members being formed with peripheral guide grooves receiving said chain member, and a handle member swivelly secured to the end of said member.

No references cited.